Patented June 9, 1942

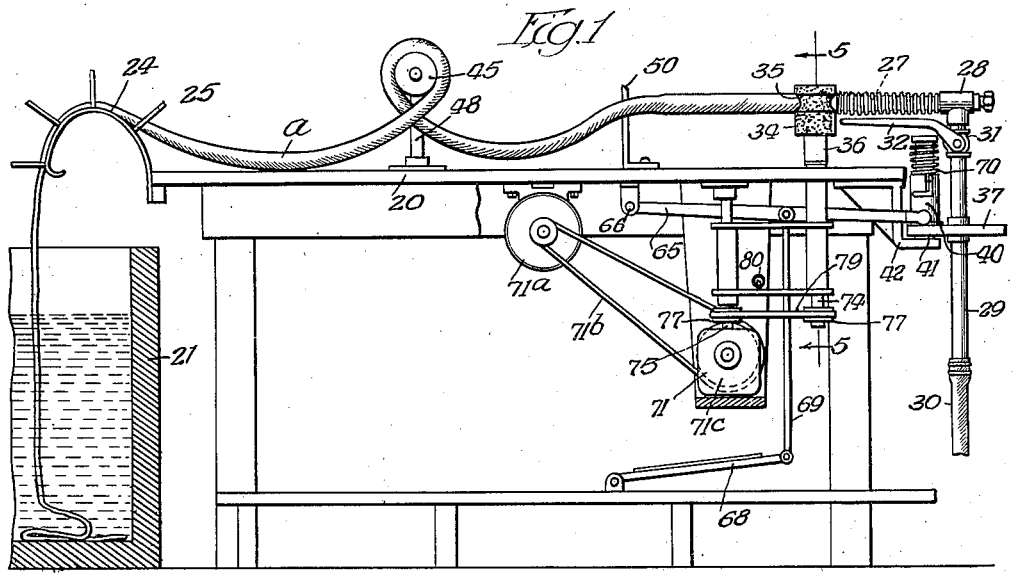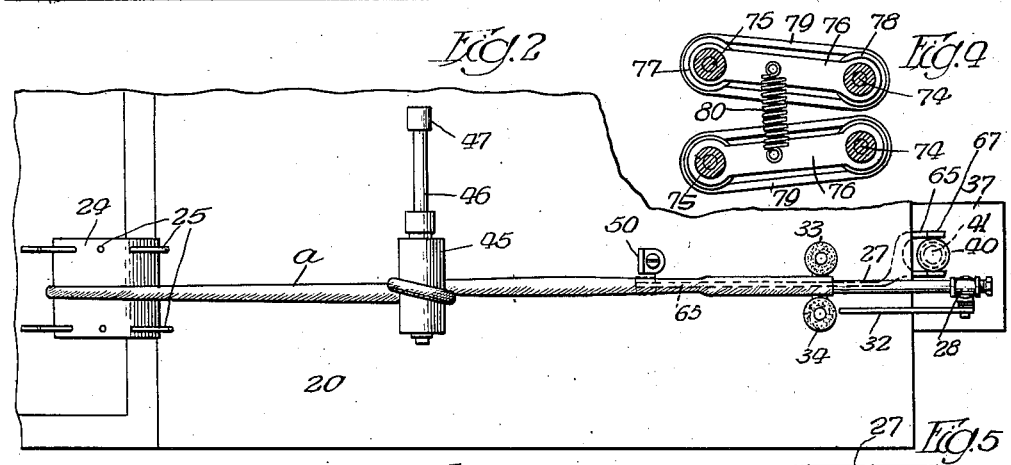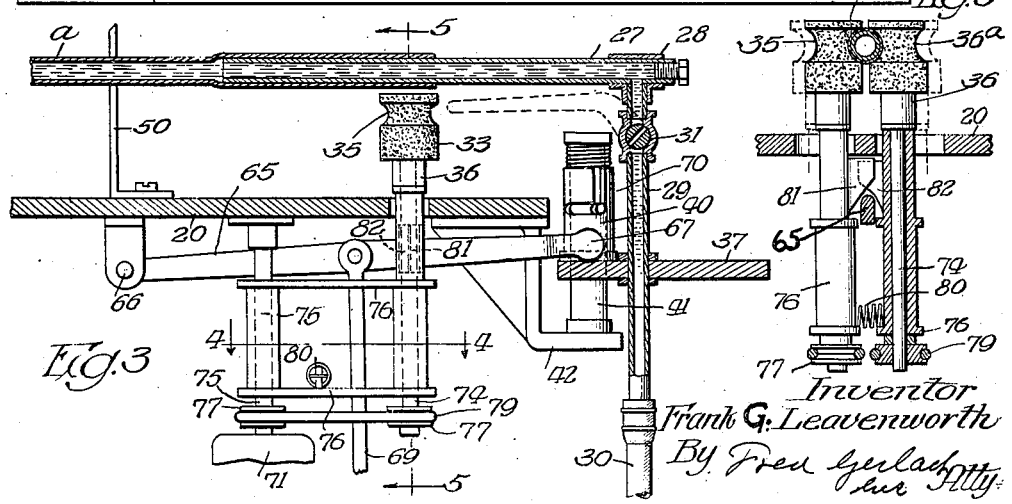

2,286,172

UNITED STATES PATENT OFFICE 2,286,172

APPARATUS FOR TESTING INTESTINES

Frank G. Leavenworth, Elmhurst, Ill., assignor, by mesne assignments, to Packers Machinery Company, Chicago, Ill., a corporation Original application September 23, 1937, Serial No. 165,329. Divided and this application December 26, 1939, Serial No. 310,903

6 Claims. (Cl. 73—51)

The invention relates to apparatus for inspecting intestines used for sausage casings.

In preparing animal intestines for use as sausage casings, it is desirable to inspect the casings while inflated with a liquid, such as water, to locate any defective spots or leaks so that the defective portions may be cut therefrom.

One object of the invention is to provide an improved apparatus which includes means for looping the extended or inflated casing so that defective spots may be readily discerned by the inspector as the casing is fed past the inspector or to a diameter-measuring device. The present application is a division of an application filed by me September 23, 1937, Serial No. 165,329, now Patent No. 2,187,790.

Other objects of the invention will appear from the following detailed description.

The invention consists in the several novel features which are hereinafter set forth and are more particularly defined by claims at the conclusion hereof.

In the drawing: Fig. 1 is a front elevation of apparatus embodying the invention. Fig. 2 is a plan. Fig. 3 is a longitudinal section through the core on which the inspected casing is fed. Fig. 4 is a section taken on line 4—4 of Fig. 3. Fig. 5 is a section taken on line 5—5 of Fig. 3.

The invention is exemplified in apparatus comprising a table 20 on which the inspecting device is mounted. The casings to be inspected are taken from a tank 21, in which the casings are usually submerged in brine, adjacent one end of the table. From tank 21 the casings are passed over an arched guide 24, which is preferably formed of a resilient plate; has one of its sides fixed to the receiving-end of table 20; and is provided with guide-pins 25 projecting from its upper face. Guide 24 is resilient to permit it to yield in the event a casing becomes tangled in tank 21 so as to prevent it from being torn.

The leading end of a casing $a$ is manually placed on a hollow core 27. This core is formed of a hollow tube, one end of which is secured in a fitting 28. Said fitting is secured in the upper end of a pipe-standard 29 which is supported in a vertically and pivotally movable support 37. The free end of core 27 is adapted to receive and fit into the leading end of a casing when it is manually placed thereon. A flexible water-supply-pipe 30 is connected to the lower end of pipe-standard 29 for delivering water through core 27 into and to distend or inflate the free end of the casing between the core 27 and guide 24. Pipe-standard 29 is provided with a valve 31 for controlling the delivery of water into the casing and the rotatable member of this valve is provided with a handle 32. By means of this water connection, the inspector, after the leading end of the casing has been placed on core 27, can, by depressing handle 32, discharge water in sufficient quantities to distend the portion of the casing between the core 27 and guide 24 for inspection purposes.

A pair of coacting feed-rolls 33 and 34 are adapted to engage the casing around core 27 and string it onto the core. Each of these feed-rolls is provided with an annular concave groove 35 to fit around the sides of the core and formed of material such as sponge-rubber, to frictionally engage the casing and advance it onto the core while the feed-rolls are in engagement with the casing.

Support 37 is vertically movable so that the core may be lowered into the horizontal plane of the grooves 35 in rolls 33, 34, for feeding the casing onto the core and so that the core may be raised above the plane of the feed-rolls where it will be free to swing laterally to permit the removal of the casing from the core. A sleeve 40, fixed to support 37, is slidable on a standard 41 which is mounted on a bracket 42, which is fixed to table 20. Support 37 is pivoted for a limited horizontal swinging movement on standard 41 so that the core can be swung forwardly into a position which permits the casing to be readily stripped from the core.

Means for lowering the support 37 to bring core 27 into and out of operative relation with feed-rolls 33, 34 comprises a lever 65 which is fulcrumed at 66 and provided with a forked abutment 67 for engaging support 27 to force it downwardly, a pedal 68, and a link 69 between said pedal and lever 65. A spring 70 is applied to hold the table normally raised and lift it when pedal 68 is released by the operator. When support 37 and the core 27 are to be lowered, the operator will depress pedal 68 and, when the pedal is released, support 37 will be restored to its raised position by spring 70.

Each feed-roll is fixed to a vertical shaft 74. Shafts 74 are journaled in brackets 76, respectively, which are adapted to swing horizontally on vertical drive shafts 75 to permit the feed-rolls to be moved apart laterally to clear and permit the vertical movement of the core and intestine thereon. A spring 80 between brackets 76 is provided to press the feed-rolls against the casing on core 27. When the brackets 76 are free to be swung inwardly by spring 80 and the core is in its lowered position, the rolls are pressed against the casing so the cavities in the sponge-rubber peripheries of the feed-rolls produce suction effects on the outside of the casing which cause the casing to be efficiently gripped and positively advanced on the core without slippage between the feed-rolls and the casing.

The shafts 75 are driven by power from suitable gearing in a box 71 which is driven by an electric motor 71ª, a belt 71ᵇ, and a pulley 71ᶜ. Said gearing is connected to drive both vertical shaft 75 on which brackets 76 are pivoted. Shafts 74 are driven from shafts 75, respectively, by a belt-pulley 77, a belt 79, and a belt-pulley 78. This mechanism drives the feed-rolls continuously and permits them to be spread apart so the core and intestine, while being lowered to the operative plane of the rolls and raised into inoperative position, can pass between the rolls.

The feed-rolls are automatically spread apart when the core is raised and released so they will be moved together by spring 80 when the core is in its lowered position, by inclined cams 81, 82 on brackets 76, respectively, which are engaged by lever 65, as said lever is moved upwardly to raise the core 27 and released when the lever is lowered. As lever 65 is raised, the feed-rolls will be initially spread apart by said lever and cams 81, 82 and while the lever remains raised the rolls will be held apart by the upper straight portions of cams 81, 82.

A drum or guide-member 45 is journaled on a horizontal shaft 46 which is supported above table 20 by a standard 48. This drum extends across the vertical plane through which the casing is fed between guide 24 and core 27. The front end of the drum is free to permit a casing to be wrapped around and placed endwise on or removed from the drum. The portion of the casing between core 27 and guide 24 is folded into a loop and placed onto the drum from the free front end thereof. As the result of looping the casing around the drum, the top area of the portions of the casing between the drum and guide 24 and between the drum and the core, will be visible to the inspector from above and the under area of said portion of the casing will be inverted as it passes over the drum so it will also be readily visible to the inspector from above as the casing is fed onto the core. The water in the casing will keep it inflated while it is passing around the drum. Preferably, the drum is rotatable. This exemplifies means around which the casing may be looped for convenient inspection of the upper and lower sides thereof as it is being advanced by the feed-rolls. The drum is an exemplification of such means, although it will be understood that in some instances a polished non-rotatable member over which the inflated casing will readily slip, may be used, in lieu of the rotatable drum.

The operation of the apparatus will be as follows: The leading end of an intestine $a$ from tank 21 will be laid over guide 24, looped around drum 45, and drawn onto the core 27 so it will be disposed between the vertical plane of the feed-rolls. Valve 31 will then be opened to fill the intestine with water and inflate the portion between the core and guide 24, including the loop around the drum. Valve 31 will then be closed. While lever 65 is raised, it will engage cams 81, 82 on brackets 86 and hold the feed-rolls spread apart so that the core can be lowered between them. The inspector will next depress pedal 68 to swing lever 65 downwardly and lower support 37 and core 27, so that the latter will be disposed in the horizontal plane of the grooves 35 in the feed-rolls. During the last portion of the downward movement of lever 65, it will release cams 81, 82 and render the spring 80 effective to press brackets 76 and the shafts 74 together so that the feed-rolls will yieldingly grip the casing on the core. The feed-rolls will be operated continuously so that as soon as they are in engagement with the casing it will be strung onto the core. As the casing is advanced over the table and around drum 45 any defects or leaks in substantially all portions of the casing will be visible to the inspector. When the inspector discovers a defective portion in the casing, he will release pedal 68 to raise the core and render the feed-rolls ineffective as the defective portion reaches a point adjacent knife 50. He will then pinch the casing at the ends of the defective portion and sever it from the remainder of the casing. When this has been done, the leading end of the portion of the casing from drum 45 will be strung onto the core sufficiently to be engaged by the feed-rolls. The pedal 68 will then be again depressed to complete the inspection of the remainder of the casing. When the inspection has been completed the pedal 68 will be released to raise the core so that it can be swung laterally into convenient position for the removal of the inspected casing from the core.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In apparatus for inspecting intestines, the combination of means for delivering fluid into and distending the intestine, means for advancing the intestine for inspection of successive portions thereof, and an element around which an inflated portion of the intestine can be looped to render opposite sides thereof visible as it is being advanced by the advancing means, said element being supported at one end and free at its other end for the placement of the loop of the intestine on and its removal from the element.

2. In apparatus for inspecting intestines, the combination of means for delivering fluid into and distending the intestine, means for advancing the intestine for inspection of successive portions thereof, and rotatable means for holding a loose portion of the intestine in the form of a loop while it is being advanced to render opposite sides thereof visible as it is being advanced by the advancing means, said holding means being rotatable by contact with the intestine.

3. In apparatus for inspecting intestines, the combination of a hollow core, means for feeding the intestine onto the core, means for delivering fluid into the core for inflating the intestine, and a horizontally extending element around which an inflated portion of the intestine can be looped to render opposite sides thereof visible as it is being fed onto the core, said element having one of its ends free so the intestine can be looped around and removed from the element.

4. In apparatus for inspecting intestines, the combination of a vertically movable core adapted to have the intestine strung thereon, means for delivering fluid into the core for inflating the intestine, co-acting rolls for feeding the intestine onto the core, and mounted to permit them to be spread apart laterally to receive the core between them, means for driving the rolls, means for raising and lowering the core, and means controlled by the core raising and lowering means for shifting the feed-rolls laterally.

5. In apparatus for inspecting intestines, the combination of a vertically movable core adapted to have the intestine strung thereon, means for delivering fluid into the core for inflating the intestine, laterally movable co-acting rolls for feeding the intestine onto the core, a spring for pressing the rolls against the core, and permitting them to be spread apart to receive the core between them, means for driving the rolls, means for raising and lowering the core, and means controlled by the raising and lowering means for the core, for spreading the feed-rolls against the force of the spring.

6. In apparatus for inspecting intestines, the combination of a vertically movable core adapted to have the intestine strung thereon, means for delivering fluid into the core for inflating the intestine, co-acting rolls for feeding the intestine onto the core, brackets pivoted to swing laterally and on which the rolls are mounted to permit them to be spread apart to receive the core between them, means for driving the rolls, means for raising and lowering the core, spring-means for pressing the brackets together, and means controlled by the raising and lowering means for the core, for spreading the brackets and feed-rolls apart.

FRANK G. LEAVENWORTH.